United States Patent [19]

Kasuya et al.

[11] Patent Number: 5,006,580

[45] Date of Patent: Apr. 9, 1991

[54] SELF-BONDING CURABLE ORGANOPOLYSILOXANE COMPOSITION

[75] Inventors: Akira Kasuya, Chiba, Japan; Toshio Suzuki, East Sussex, United Kingdom

[73] Assignee: Toray Silicone Company, Limited, Tokyo, Japan

[21] Appl. No.: 361,455

[22] Filed: Jun. 5, 1989

[30] Foreign Application Priority Data

Jun. 10, 1988 [JP] Japan ................................. 63-142930

[51] Int. Cl.$^5$ .............................................. C08K 5/24
[52] U.S. Cl. .................................. 524/264; 524/265; 524/730; 524/731; 524/406; 524/424; 524/787; 525/478; 528/15; 528/19; 528/31; 528/32
[58] Field of Search ....................... 528/15, 19, 31, 32; 625/478; 524/264, 265, 730, 731, 406, 424, 787

[56] References Cited

U.S. PATENT DOCUMENTS 4,558,109 12/1985 McAfee .................................. 528/15

OTHER PUBLICATIONS

Periodic Table of the Elements, 1962, E. H. Sargent and Co., Chicago.

*Primary Examiner*—Melvyn I. Marquis
*Attorney, Agent, or Firm*—Susan M. Cornwall

[57] ABSTRACT

An improved self-bonding curable organopolysiloxane composition which contains (A) an organopolysiloxane having at least 2 silicon-bonded alkenyl groups in each molecule, (B) an organopolysiloxane having at least 2 silicone-bonded hydrogen atoms in each molecule, (C) a catalytic quantity of a platinum-type catalyst, (D) a carbonyl complex of a Group VIB element, and (E) a compound containing a silicon-bonded alkoxy group which is selected from the group consisting of silanes or siloxane oligomers. Examples of the carbonyl complex are molybdenum hexacarbonyl, tungsten hexacarbonyl, and chromium hexacarbonyl.

8 Claims, No Drawings

SELF-BONDING CURABLE ORGANOPOLYSILOXANE COMPOSITION

BACKGROUND OF THE INVENTION

The present invention relates to an organopolysiloxane composition which cures under the effect of a platinum-type catalyst, and, more particularly, relates to a curable organopolysiloxane composition which exhibits an excellent self-bonding or self-adhering capability.

Organopolysiloxane compositions which cure under the effect of platinum-type catalysts have been known for some time now. Furthermore, a number of investigations have been conducted for the purpose of imparting self-bonding capabilities to such compositions, and these have also been the subjects of patent applications (Japanese Patent Publication Number 51-28309 [28,309/76], Japanese Patent Publication Number 52-48146 [48,146/77], Japanese Patent Publication Number 55-21782 [21,782/80], and Japanese Patent Application Laid Open [Kokai]Number 54-91159 [91,159/79]). Among these, it is known to the individual skilled in the art that an excellent self-bondability is developed by those compositions which contain organoalkoxysilane substituted by the acryloxy or methacryloxy group (abbreviated below as the (meth)acryloxy group) (Japanese Patent Publication Number 51-28309) and by compositions which contain organosiloxane oligomer carrying the epoxy, alkenyl, and alkoxy groups (Japanese Patent Publication Number 52-48146).

However, this prior art is nevertheless afflicted with a problem: this prior art displays an excellent adhesiveness or bonding when the target material for adhesion (the adherend) is an inorganic material such as a glass or metal, but when the adherend is an organic substance such as plastic, it does not develop the excellent adhesion observed with inorganic materials. The present invention, taking as its object a solution to this problem in the prior art, introduces a composition which has an excellent adhesion not only for inorganic materials, but for plastics as well.

SUMMARY OF THE INVENTION

The aforesaid object is achieved by means of a curable organopolysiloxane composition characteristically comprising (A) an organopolysiloxane having at least 2 silicon-bonded alkenyl groups in each molecule, (B) an organopolysiloxane having at least 2 silicon-bonded hydrogen atoms in each molecule, (C) a catalytic quantity of a platinum-type catalyst, (D) the carbonyl complex of a Group VIB element, and (E) a silane or siloxane oligomer, in either case containing the silicon-bonded alkoxy group, wherein the quantity of component (B) is sufficient to give a value of 0.5:1 to 1:5 for the molar ratio between the silicon-bonded hydrogen atoms in component (B) and the silicon-bonded alkenyl groups in component (A), component (D) comprises 0.0001 to 0.5 weight % of the total quantity of component (A) plus component (B), and component (E) comprises 0.01 to 10 weight % of the total quantity of component (A) plus component (B).

DETAILED DESCRIPTION OF THE INVENTION

To explain the preceding in greater detail, the composition according to the invention comprises the mixture of components (A) through (E). It cures upon standing at room temperature or heating and adheres to an adherend with which it is in contact during this curing. Each component will be considered more fully in the following.

Component (A) is an organopolysiloxane which contains at least 2 silicon-bonded alkenyl groups in each molecule, and this is the base or principal component of the composition according to the present invention. It is crosslinked by an addition reaction with component (B) under the action of component (C). The structure of this component may be any of straight chain, branched, cyclic, network, or three dimensional, nor is its molecular weight crucial. However, from the standpoint of mixing with the other components as well as the facile development of adhesiveness, it will be preferred that at least half of this component be straight chain or branched and that its viscosity at 25 degrees Centigrade not exceed 1,000,000 centipoise.

The silicon-bonded alkenyl group is exemplified by vinyl, allyl, propenyl, butenyl, pentenyl, hexenyl, heptenyl, octenyl, nonenyl, and decenyl. With regard to the location of the double bond in the alkenyl group, it preferably appears at the terminus away from the silicon atom based on a consideration of the reactivity in the curing reaction. Examples of silicon-bonded organic groups other than the alkenyl group are alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as trifluoropropyl and chloromethyl. In addition, small quantities of hydroxyl groups and alkoxy groups may also be present among the silicon-bonded groups. From the standpoints of economics and the development of excellent adhesion, it is preferred that methyl comprise at least half the number of silicon-bonded groups.

Component (B) is an organopolysiloxane having at least 2 silicon-bonded hydrogen atoms in each molecule, and this component is a crosslinker for the composition of the present invention. It crosslinks component (A) by an addition reaction with component (A) under the action of component (C). The structure and molecular weight of this component are not crucial. Other than the hydrogen atoms, the silicon-bonded groups are exemplified by the groups listed by way of explanation for component (A). It is preferred that methyl comprise the major proportion of these groups. Specific examples of this component are as follows: trimethylsiloxy-terminated methylhydrogenpolysiloxanes, trimethylsiloxy-terminated dimethylsiloxane-methylhydrogensiloxane copolymers, dimethylhydrogensiloxy-terminated methylhydrogenpolysiloxanes, dimethylhydrogensiloxy-terminated dimethylpolysiloxanes, dimethylhydrogensiloxy-terminated dimethylsiloxanemethylhydrogensiloxane copolymers, cyclic methylhydrogenpolysiloxanes, cyclic dimethylsiloxane-methylhydrogensiloxane copolymers, tetrakis(dimethylhydrogensiloxy)silane, copolymers composed of $(CH_3)_2HSiO_{\frac{1}{2}}$ units, $(CH_3)_3SiO_{\frac{1}{2}}$ units, and $SiO_2$ units, and copolymers composed of $(CH_3)HSiO_{\frac{1}{2}}$ units, $(CH_3)_3SiO_{\frac{1}{2}}$ units, $CH_3SiO_{3/2}$ units, and $SiO_2$ units.

Component (B) is to be blended in a quantity with affords a value of from 0.5:1 to 5:1 for the molar ratio between the silicon-bonded hydrogen atoms in this component and the alkenyl groups in component (A). Crosslinking will be unsatisfactory at values below 0.5:1, while the cured product will be too hard at values in excess of 5:1. preferred quantities of addition give values of from 0.8:1 to 3:1 for this molar ratio.

Component (C) is a catalyst of the crosslinking reaction between components (A) and (B), and comprises platinum and platinum-type metals such as rhodium, palladium, cobalt, and nickel as well as compounds thereof. Specific examples in this regard are finely divided platinum, platinum/asbestos, platinum/carbon, chloroplatinic acid, alcohol solutions of chloroplatinic acid, platinum-olefin complexes, platinum-alkenylsiloxane complexes, platinum/beta-diketone complexes, and the phosphine complexes of platinum and rhodium. While the quantity of addition of this component is not particularly crucial, preferred quantities will give 0.1 ppm to 100 ppm as the quantity of platinum or platinum-type metal based on the total quantity of components (A) plus (B).

Component (D), the carbonyl complex of a Group VIB element, is an essential component for equipping the composition according to the present invention with a self-bonding or self-adhering capability. Specific examples of this component are molybdenum hexacarbonyl, tungsten hexacarbonyl, and chromium hexacarbonyl. The method of addition of component (D) is not particularly critical. However, because these complexes are solids at room temperature, it is recommended that they be added after dissolution in a solvent. While any solvent which dissolves these carbonyl complexes can be used here, low-boiling solvents are preferred considering that they can be removed after addition. Examples of the solvent are ethers such as diethyl ether, dipropyl ether, methyl ethyl ether, methyl propyl ether, and ethyl propyl ether; aliphatic hydrocarbons such as pentane, hexane, heptane, octane, nonane, and decane; and halogenated hydrocarbons such as chloroform and carbon tetrachloride.

This component should be added in an amount which affords 0.0001 to 0.5 weight % of the component under consideration based on the total quantity of components (A) plus (B). An excellent adhesion will not develop when using quantities below 0.0001 weight %, while the properties of the cured composition will suffer at values in excess of 0.5 weight %. The preferred quantity of addition is 0.001 to 0.1 weight %.

Component (E), a silane containing the silicon-bonded alkoxy group or a siloxane oligomer containing the silicon-bonded alkoxy group, is also an essential component for imparting self-bonding characteristics to the composition of the present invention. Component (E) is already known in a number of cases as an adhesion improver for curable organopolysiloxane compositions; however, by virtue of its co-use with component (D), the adhesiveness with respect to plastics in particular manifests a remarkable improvement compared even to the addition of component (E) alone as adhesion improver. The component under consideration is exemplified as follows: silanes such as 3-glycidoxypropyltrimethoxysilane, 2-(3',4'-epoxycyclohexyl)ethyltrimethoxysilane, bistrimethoxysilylethane, 3-(meth)acryloxypropyltrimethoxysilane, 1-acryloxymethyltrimethoxysilane, vinyltrimethoxysilane, allyltriethoxysilane, hydrogentriethoxysilane, and the like; the partial hydrolyzates of such silanes; the condensates obtained from such silanes and silanol-terminated diorganosiloxane oligomers; and the mixtures and reaction products of such silanes with polyvalent alcohols. With regard to the use of these adhesion improvers, addition after preliminarily dissolving the carbonyl complex comprising component (D) in the adhesion improver is also a recommended method.

This component should be added in a quantity which gives 0.01 to 10 weight % of this component based on the combined quantity of components (A) plus (B). An excellent adhesion does not develop when using quantities below 0.01 weight %, while the properties of the cured composition are compromised by using more than 10 weight %. The preferred quantity of addition is 0.1 to 5 weight %.

The composition according to the present invention is obtained by mixing components (A) through (E). In addition to these, various other additives can be admixed in response to the various purposes at hand. Examples in this regard are inorganic fillers such as dry-method silicas, wet-method silicas, natural silicas, diatomaceous earth, silica balloons, calcium carbonate, carbon black, titanium dioxide, aluminum oxide, aluminum hydroxide, and zinc oxide, etc.; colorants; heat stabilizers; oxidation inhibitors; flame retardants; etc. Furthermore, in order to adjust the rate of the crosslinking reaction, it may be advantageous to add small quantities of acetylenic compounds, amine compounds, mercaptan compounds, phosphorus compounds, or the like. In addition, solvent or silicone oil can be admixed in order to reduce the viscosity.

The composition according to the present invention can be prepared using various mixing and kneading devices, for example, planetary mixers, kneader mixers, screw mixers, impeller mixers, static mixers, two-roll mills, three-roll mills, twin-screw extruders, etc.

The composition according to the present invention can be cured either at room temperature or with heating. Heating on the level of 70 to 200 degrees Centigrade is recommended in order to obtain a better adhesion.

The composition according to the present invention will adhere to many adherends with which it is in contact during curing, and it exhibits an excellent adhesion for glasses, metals, metal oxides, and plastics. An excellent adhesion is developed for resins such as, for example, phenolic resins, epoxy resins, polyamides, unsaturated polyesters, polyethylene terephthalates, polybutylene terephthalates, polycarbonates, polyphenylene sulfides, polyacetals, polyimides, etc. Exploiting these various properties, it can be used in various fields of industry, among other things, for the bonding, adhesion, immobilization or fixing, insulation sealing, and coating of electrical and electronic components; for the adhesion, immobilization or fixing, and gap sealing of mechanical components and appliances; and for the adhesion or lamination of textiles.

EXAMPLES

Illustrative examples of the present invention are given below. In the examples, parts=weight parts, and percent and %=weight percent.

Unless specified otherwise, the values for the properties were obtained at 25 degrees Centigrade. In the formulas and structures, Me=the methyl group and Vi=the vinyl group.

EXAMPLE 1

100 parts dimethylvinylsiloxy-terminated dimethylpolysiloxane (viscosity=2,000 centipoise, average degree of polymerization (Dp)=300), 20 parts dry-method silica with specific surface area=200 $m^2/g$ and a hexamethyldisilazane-treated surface, the tetramethyldivinyldisiloxane complex of chloroplatinic acid in a quantity sufficient to give 5 ppm as platinum metal based on the above dimethylpolysiloxane, 1.8 parts trimethylsiloxy-terminated methylhydrogensiloxanedimethylsiloxane copolymer (average Dp=10, each molecule contains an average of 5 methylhydrogensiloxane units), and 0.01 part 3-methyl-1-butyne-3-ol were mixed to homogeneity to prepare a composition A. The molar ratio between total silicon-bonded hydrogen atoms and total vinyl groups (H/Vi) in this composition A was 1.5.

To this composition A were added 1 part 3-glycidoxypropyltrimethoxysilane and 0.6 parts of a 1% diethyl ether solution of molybdenum hexacarbonyl, followed by mixing to homogeneity to give a composition A-1. Using this composition A-1 and the adherends listed in Table 1, tensile adhesion test specimens were prepared based in Japanese Industrial Standard (JIS) K 6301 (but using the various adherends given in place of the metal plate stipulated in this JIS standard). Curing was carried out by standing in an oven at 120 degrees Centigrade for 1 hour. The tensile adhesive strength is reported in Table 1. For comparison, a composition A-2 was prepared by mixing only 1 part 3-glycidoxypropyltrimethoxysilane into the above composition A, and its tensile adhesive strength is also reported.

TABLE 1

| Adherends | Compositions | |
| --- | --- | --- |
| | Present Invention A-1 | Comparison Example A-2 |
| Iron Plate | 31 | 30 |
| Nickel Plate | 28 | 14 |
| Epoxy Glass | 21 | 0 |
| PBTP* | 22 | 11 |
| Nylon-6 | 22 | 14 |
| PPS** | 26 | 0 |
| Polycarbonate | 10 | 0 |

Units: kg/cm$^2$
*polybutylene terephthalate
**polyphenylene sulfide

EXAMPLE 2

100 Parts dimethylvinylsiloxy-terminated dimethylpolysiloxane (average DP=300, viscosity=2,000 centipoise), 20 parts dry-method silica with specific surface area=200 m$^2$/g and a hexamethyldisilazane-treated surface, the tetramethyldivinyldisiloxane complex of chloroplatinic acid in a quantity sufficient to give 5 jppm as platinum metal based on the above dimethylpolysiloxane, and 0.9 parts trimethylsilyl-terminated methylhydrogenpolysiloxane (average DP=40) were mixed to homogeneity to give a composition B. H/Vi in this composition B was 1.6. A composition B-1 was prepared by mixing 1 part bistrimethoxysilylethane and 2 parts of a 1% diethyl ether solution of molybdenum hexacarbonyl into composition B. Test specimens were prepared as in Example 1 using composition B-1 and the adherends in Table 2. Curing was carried out by standing in an oven at 120 degrees Centigrade for 1 hour. The tensile adhesive strength is reported in Table 2. For comparison, a composition B-2 was prepared by mixing only 1 part bistrimethoxysilylethane into the aforementioned composition B, and its tensile adhesive strength is also reported.

TABLE 2

| adherends | compositions | |
| --- | --- | --- |
| | present invention B-1 | comparison example B-2 |
| iron plate | 23 | 29 |
| nickel plate | 23 | 32 |
| epoxy glass | 26 | 30 |
| PBTP | 22 | 14 |
| nylon-6 | 15 | 0 |
| polycarbonate | 21 | 0 | units: kg/cm$^2$

EXAMPLE 3

100 parts dimethylvinylsiloxy-terminated dimethylpolysiloxane (average DP=300, viscosity=2,000 centipoise), 20 parts dry-method silica with specific surface area=200 m$^2$/g and a hexamethyldisilazane-treated surface, the tetramethyldivinyldisiloxane complex of chloroplatinic acid in a quantity sufficient to give 5 ppm as platinum metal based on the above dimethylpolysiloxane, 1.5 parts methylhydrogenpolysiloxane with the average compositional formula $(Me_2HSiO_{178})_{10}(SiO_2)_6$, and 0.01 part 3-methyl-1-butyne-3-ol were mixed to homogeneity to prepare a composition C. H/Vi in this composition C was 1.7.

1 part 1-acryloxymethyltrimethoxysilane and 1 part of a 2% diethyl ether solution of molybdenum hexacarbonyl were added to this composition C, and a composition C-1 was prepared by mixing to homogeneity. Using this composition C-1 and the adherends listed in Table 1, tensile adhesion test specimens were prepared based on JIS K 6301 (but using the various adherends given in place of the metal plate stipulated in this JIS standard). Curing was executed by standing for 1 hour in an oven at 120 degrees Centigrade. The tensile adhesive strength is reported in Table 3. For comparison, a composition C-2 was prepared by mixing only 1 part 1-acryloxymethyltrimethoxysilane into the aforementioned composition C-1, and its tensile adhesive strength is also reported.

TABLE 3

| adherends | compositions | |
| --- | --- | --- |
| | present invention C-1 | comparison example C-2 |
| iron plate | 36 | 41 |
| nickel plate | 30 | 42 |
| epoxy glass | 41 | 36 |
| PBTP | 33 | 15 |
| nylon-6 | 13 | 0 |
| PPS | 17 | 0 |
| polycarbonate | 14 | 0 | units: kg/cm$^2$

The curable organopolysiloxane composition according to the present invention, because it contains a special component comprising the carbonyl complex of a Group VIA element in addition to an already known adhesion improver in the form of a silane or siloxane oligomer containing silicon-bonded alkoxy, is characterized by an excellent adhesion to substances with which it is in contact during curing, and is characterized in particular by an excellent adhesion or bonding to plastics.

That which is claimed is:

1. A curable organopolysiloxane composition comprising (A) an organopolysiloxane having at least 2 silicon-bonded alkenyl groups in each molecule, (B) an organopolysiloxane having at least 2 silicon-bonded hydrogen atoms in each molecule, (C) a catalytic quantity of a platinum catalyst, (D) a carbonyl complex of an element selected from the group consisting of molybdenum, tungsten, and chromium, and (E) a compound containing a silicon-bonded alkoxy group selected from the group consisting of silanes and siloxane oligomers, wherein the quantity of component (B) is sufficient to give a value of 0.5:1 to 1:5 for the molar ratio between the silicon-bonded hydrogen atoms in component (B) and the silicon-bonded alkenyl groups in component (A), component (D) comprises 0.0001 to 0.5 weight % of the total quantity of component (A) plus component (B), and component (E) comprises 0.01 to 10 weight % of the total quantity of component (A) plus component (B).

2. A curable organopolysiloxane composition as claimed in claim 1 wherein the carbonyl complex is molybdenum hexacarbonyl.

3. A curable organopolysiloxane composition as claimed in claim 1 wherein the carbonyl complex is chromium hexacarbonyl.

4. A curable organopolysiloxane composition as claimed in claim 1 wherein the carbonyl complex is tungsten hexacarbonyl.

5. A curable organopolysiloxane composition comprising (A) an organopolysiloxane having at least 2 silicon-bonded alkenyl groups in each molecule, (B) an organopolysiloxane having at least 2 silicone-bonded hydrogen atoms in each molecule, (C) a catalytic quantity of a catalyst selected from the group consisting of platinum, rhodium, palladium, cobalt, and nickel, (D) a carbonyl complex of an element selected from the group consisting of molybdenum, tungsten, and chromium, and (E) a compound containing a silicon-bonded alkoxy group selected from the group consisting of silanes and siloxane oligomers, wherein the quantity of component (B) is sufficient to give a value of 0.5:1 jto 1:5 for the molar ratio between the silicon-bonded hydrogen atoms in component (B) and the silicon-bonded alkenyl groups in component (A), component (D) comprises 0.0001 to 0.5 weight % of the total quantity of component (A) plus component (B), and component (E) comprises 0.01 to 10 weight % of the total quantity of component (A) plus component (B).

6. A curable organopolysiloxane composition as claimed in claim 5 wherein the carbonyl complex is selected from the group consisting of molybdenum hexacarbonyl, chromium hexacarbonyl, and tungsten hexacarbonyl.

7. A curable organopolysiloxane composition comprising (A) an organopolysiloxane having at least 2 silicon-bonded alkenyl groups in each molecule, (B) an organopolysiloxane having at least 2 silicone-bonded hydrogen atoms in each molecule, (C) a catalytic quantity of a catalyst selected from the group consisting of chloroplatinic acid, platinum-olefin complexes, platinum-alkenylsiloxane complexes, platinum/beta-diketone complexes, and phosphine complexes of platinum and rhodium, (D) a carbonyl complex of an element selected from the group consisting of molybdenum, tungsten, and chromium, and (E) a compound containing a silicon-bonded alkoxy group selected from the group consisting of silanes and siloxane oligomers, wherein the quantity of component (B) is sufficient to give a value of 0.5:1 to 1:5 for the molar ratio between the silicon-bonded hydrogen atoms in component (B) and the silicon-bonded alkenyl groups in component (A), component (D) comprises 0.0001 to 0.5 weight % of the total quantity of component (A) plus component (B), and component (E) comprises 0.01 to 10 weight % of the total quantity of component (A) plus component (B).

8. A curable organopolysiloxane composition as claimed in claim 7 wherein the carbonyl complex is selected from the group consisting of molybdenum hexacarbonyl, chromium hexacarbonyl, and tungsten hexacarbonyl.

* * * * *